March 8, 1949.  W. G. LUNDQUIST ET AL  2,463,890
COMBINED SEAL AND LUBRICATION SYSTEM
Filed Dec. 9, 1944  2 Sheets-Sheet 1

INVENTORS
WILTON G. LUNDQUIST.
FERDINAND P. SOLLINGER.
BY
ATTORNEY

March 8, 1949. W. G. LUNDQUIST ET AL 2,463,890
COMBINED SEAL AND LUBRICATION SYSTEM
Filed Dec. 9, 1944 2 Sheets-Sheet 2

INVENTORS
WILTON G. LUNDQUIST.
FERDINAND P. SOLLINGER.
BY
ATTORNEY

Patented Mar. 8, 1949

2,463,890

UNITED STATES PATENT OFFICE 2,463,890

COMBINED SEAL AND LUBRICATION SYSTEM

Wilton G. Lundquist, Hohokus, and Ferdinand P. Sollinger, Paterson, N. J., assignors to Wright Aeronautical Corporation, a corporation of New York Application December 9, 1944, Serial No. 567,376

10 Claims. (Cl. 308—127)

This invention relates to bearings and is particularly directed to the provision of a method and/or means for scavenging oil from a bearing. In addition, the invention comprises a method and/or a means for providing a gas seal at an end of a bearing.

In a pressure lubricated plain bearing, it is conventional practice to permit the oil supplied to the bearing to escape from one or both ends of the bearing into a collecting chamber from which it is returned to a supply reservoir for recirculation. It is an object of this invention to collect the oil leaving an end of a bearing in an annulus rotating with the bearing journal. It is a further object of this invention to use the centrifugal force acting on the oil in this rotating annulus to force the oil therefrom back through a return passage into an oil reservoir. In this way, the bearing provides its own scavenge pump for returning the lubricating oil therefrom. This scavenge pump action is particularly effective in connection with bearing journals having high rotative speeds because of the large centrifugal forces resulting therefrom.

It is a further object of this invention to use this rotating annulus of lubricating oil at one end of the bearing to provide a gas seal. Thus, for example in a blower or turbine installation there may be a considerable gas pressure differential between the ends of a bearing which it is desired to seal to prevent leakage of gas across the bearing. In accordance with the present invention, such a gas pressure differential may be effectively sealed by extending an annular baffle member into the rotating annulus of oil at one or both ends of the bearing. Other objects of this invention will become apparent upon reading the annexed detailed description in connection with the drawing in which:

Figure 1:
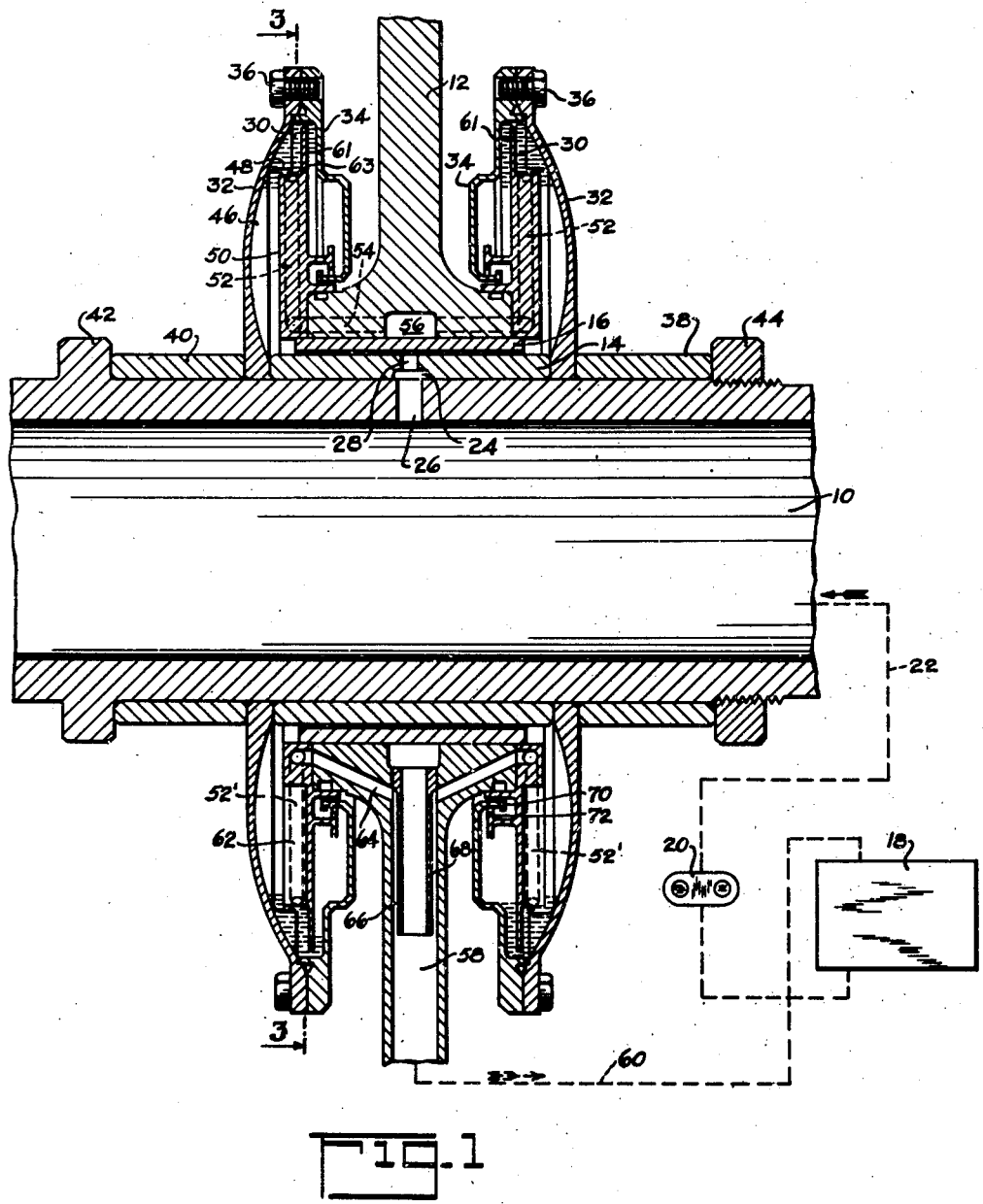
Figure 1 is an axial section along line 1—1 of Figure 3 through a bearing and journal therefore embodying the invention and schematically illustrating the lubricating oil flow circuit.

Referring to the drawing, a hollow shaft 10 is journaled within a fixed bearing support 12. The shaft 10 is provided with a sleeve 14 secured thereto and a bushing 16 is disposed between the sleeve 14 and the bearing support 12. Lubricating oil from a supply tank or reservoir 18 is supplied to the hollow of the shaft 10 by a pump 20 through a passage indicated schematically at 22. The sleeve 14 is provided with an annular groove 24, and the shaft 10 and sleeve 14 are each provided with one or more radial drillings 26 and 28 communicating with the annular groove 24 and with the hollow of the shaft 10, whereby lubricating oil is supplied through the shaft 10 to the center of bushing 16. With this construction, lubricating oil flows oppositely from the center of the bushing 16 to the opposed ends of the bearing.

Figure 2:
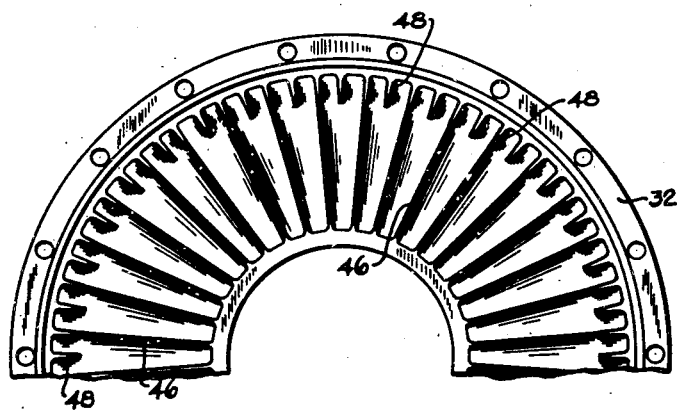
Figure 2 is an end view of one of the annular members forming the annular oil collecting channel and illustrating the vanes thereon.

An inwardly facing annular channel or groove 30 is provided at each end of the bearing for collecting the oil flowing therefrom. Each channel 30 comprises annular members 32 and 34 secured together at their outer periphery, for example, by bolts 36. The annular members 32 are clamped to the shaft 10 with the sleeve 14 and spacing sleeves 38 and 40 between a shoulder 42 and a nut 44 on the shaft 10. The annular member 34 extends inwardly from its outer periphery toward the shaft 10 but terminates in spaced relation thereto and together with the annular member 32 defines the annular channel 30. In this way, the oil escaping from each end of the bearing impinges on the adjacent rotating annular member 32 and is thrown radially outward by the centrifugal force acting thereon into the annular channels 30. The annular rotating members 32 may be provided with radially disposed vanes 46 and 48 as best seen in Figure 2 of the drawing in order to insure rotation of the oil therewith.

An annular baffle member 50 is secured to each end of the hub of the fixed bearing support 12 by bolts 51 and each of the baffle members 50 extend into their associated oil collecting channels 30. Each of the baffle members 50 is provided with a plurality of inwardly extending passages 52 and a similar passage 52' disposed at the under or bottom side of its associated baffle member. The passages 52' are hereinafter further described. The inner ends of passages 52 are alined with passages 54 in the bearing support 12 which communicate with an annulus 56 in the hub of the bearing support. The bearing support 12 is also provided with a drain passage 58 extending downwardly from the annulus 56 and communicating with a conduit indicated schematically at 60 which opens into the oil reservoir 18.

With this construction, upon operation of the shaft 10 and the oil pressure pump 20, oil under pressure is supplied to the center of the bearing bushing 16 from the hollow of shaft 10 and through radial openings 26 and 28 and the oil flows axially along the inner surface of the bushing 16 to the ends of the bearing. The oil leaving the ends of the bearing either drops into the adjacent annular channel 30 or the oil strikes the side of the adjacent annular member 32 and its vanes 46 whereby this oil is caused to rotate and the resulting centrifugal force throws the oil outwardly into the annular channel 30. The oil is held in each annular channel 30 by the centrifugal force acting thereon, the vanes 48 helping to keep the oil annulus rotating with the associated annular channel 30. When the radial depth of the oil annulus within each channel 30 covers the open ends of the associated passages 52, the centrifugal force on the oil within the channels 30 tends to force oil through these passages 52 and thence into passage 54, annulus 56, drain passage 58, and back into the oil reservoir 18. With a sufficient speed of rotation of the shaft 10, the centrifugal force acting on the oil within the rotating channels 30 will force oil therefrom back into the reservoir 18. In this way, each bearing in effect is provided with a pair of centrifugal pumps for returning the oil leaving the two ends of the bearing back to the oil reservoir.

Figure 3:
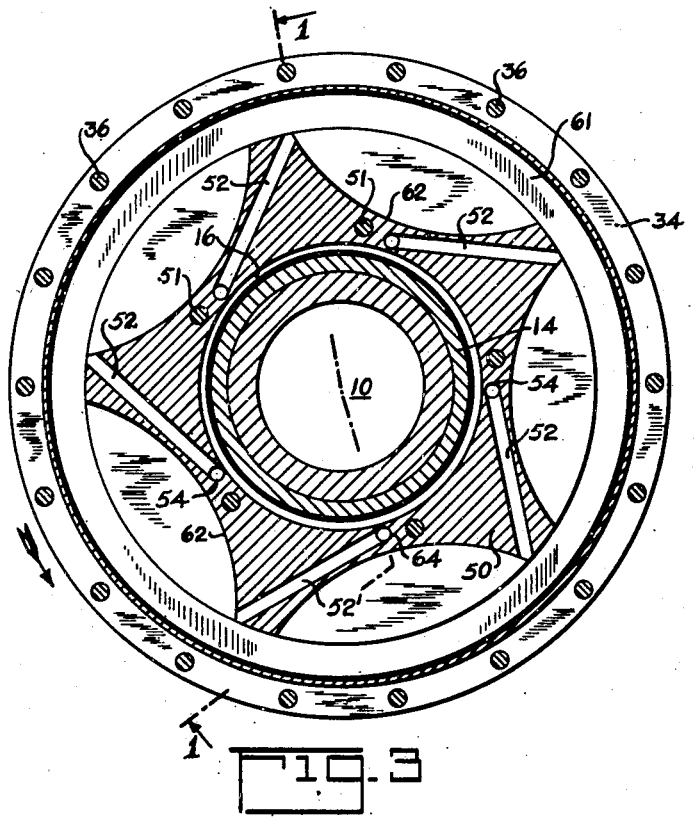
Figure 3 is a sectional view taken along line 3—3 of Figure 1.

The periphery of each baffle member 50 preferably is provided with a radial extension 61 of reduced thickness on its side adjacent the bearing thereby defining a shoulder 63. The shoulder 63 is provided with a series of circumferentially spaced cut-out sections 62 and each of the passages 52 is partially directed into the direction of rotation of the oil annulus at an outer end of one of the cut-out sections 62, the direction of rotation being indicated by the arrow in Figure 3. In this way, the oil within each of the rotating channels 30 is forced or pumped into the passages 52 not only by the centrifugal force acting on the oil but also by the impact pressure of the moving oil within each channel 30 relative to the facing open ends of their associated passages 52.

The radial extensions 61 of the baffle members 50 extend into their associated oil annuli and channels 30 to provide a gas seal across each baffle member 50, that is a seal is provided between each side of the bearing support 12 and the adjacent end of the bearing. For example, as viewed in Figure 1, with the left hand side of the bearing support 12 subjected to a relatively high pressure, this pressure will displace the oil within the left hand channel 30 on opposite sides of the associated baffle member 50 and its extension 61 as illustrated, until the difference in the radial depths of the oil on the two sides of this baffle member is such that the difference in the centrifugal forces acting on the oil on the two sides of the baffle member just balances the gas pressure differential on opposite sides of the baffle member. Similarly, the baffle member 50 and oil annulus at the right hand side of the bearing provides a gas seal between the opposite sides of this baffle member. If the pressure on the right hand side of the bearing support is substantially atmospheric pressure there will be little or no difference in the oil level in the channel 30 on opposite sides of the right hand baffle member 50.

The entrance ends of the passages 52 are disposed a substantial distance radially inwardly of the outer periphery of the radial extension 61 of their associated baffle members 50, and therefore since each annular channel 30 fills with oil to a radial depth sufficient to cover the open end of its passages 50, each baffle member 50 projects a substantial distance into its associated oil annulus. This projection of each baffle member 50 into its associated oil annulus radially beyond the entrance ends of the oil passages 52 permits a substantial relative displacement of the oil on opposite sides of the baffle member in response to a pressure differential thereacross without disturbing the seal effected by the oil annulus and baffle member and without disturbing the return of oil through passages 52. As indicated by the arrow in Figure 3, the open outer ends of the passages 52 partly face against the direction of rotation of the annular channel 30 thereby facilitating circulation of oil from said channel into said passages.

In order to prevent spilling out of the oil over the inner edge of annular member 34 when the shaft 10 stops rotating, the cross sectional area of the channel 30 is designed such that the entire quantity of the oil normally rotating therein can be accommodated in the lower portion of the channel between annular members 32 and 34. Also, the passage 52' opening into the bottom of each channel 30 communicates with a passage 64 in the bearing support 12 which, instead of opening into the annulus 56, opens into an annular passage 66 about the drain passage 58 and formed by a sleeve member 68 securely fitted within the drain passage 58. The annular passage defined about the sleeve member 68 is closed at its upper end except for communication with the passage 64 and its lower end extends down to a point below the open end of the associated passage 52. In this way, oil is pumped through each bottom passage 52' as well as through passages 52, into drain passage 58 back into the reservoir 18 and in addition each bottom passage 52' and the communicating passages 64 and 66 define a siphon whereby when the shaft 10 stops rotating, the oil annulus within each channel 30 drains into its lower portion from which the oil is siphoned out into the drain passage 58. As a further means to prevent oil from spilling out of the channels 30, each baffle member 50 and annular member 34 are respectively provided with overlapping flanges 70 and 72.

As an illustration of a specific use of the present invention, the shaft 10 may comprise a shaft of a gas turbine with the left hand side of the the bearing support subjected to the pressure of the turbine motive fluid. Also at this point it should be noted that in a particular installation it may only be necessary or desirable to provide the aforedescribed rotating oil annulus construction at one end of the bearing.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. In combination, a rotatable journal, a bearing structure therefor, means for supplying oil for lubricating the bearing surface of said journal, rotatable means providing an inwardly facing annular channel adjacent one end of said bearing structure and adapted to receive oil leaving said bearing structure end to provide a rotating oil annulus therein, and a fixed annular baffle member extending within said annular channel and into said oil annulus.

2. In combination, a rotatable journal, a bearing structure therefor, means for supplying oil for lubricating the bearing surface of said journal, means secured to said journal adjacent one end of said bearing structure and providing an inwardly facing annular channel disposed about and in communication with said bearing end such that oil leaving said bearing end is received within said channel to provide a rotating oil annulus therein, and an annular baffle member secured to said bearing structure and extending within said annular channel, said baffle member having an oil drain passage opening into said channel.

3. In combination, a rotatable journal, a bearing structure therefor, means for supplying oil for lubricating the bearing surface of said journal, means secured to said journal adjacent one end of said bearing structure and providing an inwardly facing annular channel disposed about and in communication with said bearing end such that oil leaving said bearing end is thrown outwardly into said channel, and an annular baffle member secured to said bearing structure and extending within said annular channel, said baffle member having an oil drain passage opening into said channel, the periphery of said annular baffle member extending radially outwardly into said channel a substantial distance beyond the channel end of said passage.

4. In combination, a rotatable journal, a bearing structure therefor, means for supplying oil for lubricating the bearing surface of said journal, means secured to said journal adjacent one end of said bearing structure and providing an inwardly facing annular channel disposed about and in communication with said bearing end such that during journal operation the oil leaving said bearing end is received within said channel to provide a rotating oil annulus therein, and an annular baffle member extending within said channel and into said oil annulus, said baffle member having one or more oil drain passages opening into said channel inwardly of the outer periphery of said annular baffle member within said channel.

5. In combination, a rotatable journal, a bearing structure therefor, means for supplying oil for lubricating the bearing surface of said journal, means secured to said journal adjacent one end of said bearing structure and providing an inwardly facing annular channel disposed about and in communication with said bearing end such that during journal operation the oil leaving said bearing end is received within said channel to provide a rotating oil annulus therein, and an annular baffle member secured to the hub of said bearing structure and extending outwardly therefrom into said channel and said oil annulus, said baffle member having one or more oil passages opening into said channel inwardly of the outer periphery of said annular baffle member within said channel, said one or more oil passages communicating with a drain passage within said bearing structure.

6. In combination, a rotatable journal, a bearing structure therefor, means for supplying oil for lubricating the bearing surface of said journal, means secured to said journal adjacent one end of said bearing structure and providing an inwardly facing annular channel disposed about and in communication with said bearing end such that during journal operation the oil leaving said bearing end is thrown outwardly into said channel to provide a rotating oil annulus therein, and an annular baffle member secured to the hub of said bearing structure and extending outwardly therefrom into said channel and said oil annulus, said baffle member having one or more oil passages opening into said channel and communicating with a drain passage within said bearing structure, said baffle member also having an additional oil passage opening into said channel and oil annulus adjacent their bottom and extending upwardly therefrom to an oil passage within said bearing structure which in turn communicates with said drain passage at a level below the channel end of said additional passage.

7. In combination with a bearing, a rotatable journal, means for supplying oil for lubricating the bearing surface of said journal, means secured to said journal adjacent one end of said bearing and providing an inwardly facing annular channel disposed about and in communication with said bearing end such that during journal operation the oil leaving said bearing end enters said annular channel to provide a rotating oil annulus therein, and means providing an oil passage opening at one end into said channel and oil annulus adjacent their bottom and extending upwardly out of said channel and then downwardly into communication with a drain passage at a level below its said one end.

8. In combination, a rotatable journal, a bearing structure therefor, means for supplying oil for lubricating the bearing surface of said journal, means rotatable adjacent one end of said bearing structure and providing an inwardly facing annular channel disposed about and in communication with said bearing end such that oil leaving said bearing end is received within said channel to provide a rotating oil annulus therein, and an annular fixed baffle member extending into said channel and the oil annulus therein, said annular baffle member having an oil drain passage opening into said channel inwardly of the outer periphery of said annular baffle member within said channel.

9. In combination, a rotatable member having an inwardly facing annular channel, means for supplying a liquid to said channel to provide a liquid annulus therein upon rotation of said member, and an annular baffle member extending into said channel and adapted to extend into said liquid annulus, said baffle member having a liquid drain passage opening into said channel radially inwardly of the outer periphery of said baffle member within said channel and radially outwardly of the inner edge of said channel.

10. In combination, a rotatable member having an inwardly facing annular channel, means for supplying a liquid to said channel to provide a liquid annulus therein upon rotation of said member, and an annular baffle member extending into said channel and adapted to extend into said liquid annulus, said baffle member having a liquid drain passage opening into said channel radially inwardly of the outer periphery of said baffle member within said channel and radially outwardly of the inner edge of said channel, the radially outer ends of said passages at least partly facing against the direction of rotation of said channel.

WILTON G. LUNDQUIST.
FERDINAND P. SOLLINGER.

REFERENCES CITED

The following references are of record in the file of this patent:

UNITED STATES PATENTS

| Number | Name | Date |
|---|---|---|
| 832,877 | Richards | Oct. 9, 1906 |
| 1,014,850 | Richardson | Jan. 16, 1912 |
| 1,070,809 | Hodgkinson | Aug. 19, 1913 |
| 1,369,110 | Jacobs | Feb. 22, 1921 |
| 1,684,341 | Bethel | Sept. 11, 1928 |
| 1,784,104 | Masterson et al. | Dec. 9, 1930 |
| 1,806,929 | Bath | May 26, 1931 |
| 1,879,627 | Mendenhall | Sept. 27, 1932 |
| 2,133,879 | Thearle | Oct. 18, 1938 |

FOREIGN PATENTS

| Number | Country | Date |
|---|---|---|
| 15,530 | Australia | Dec. 12, 1933 |